No. 607,652. Patented July 19, 1898.
A. BURGIN.
WATER SUPPLYING AND CONTROLLING APPARATUS FOR WATER CLOSET TANKS.
(Application filed Jan. 28, 1898.)
(No Model.) 2 Sheets—Sheet 2.
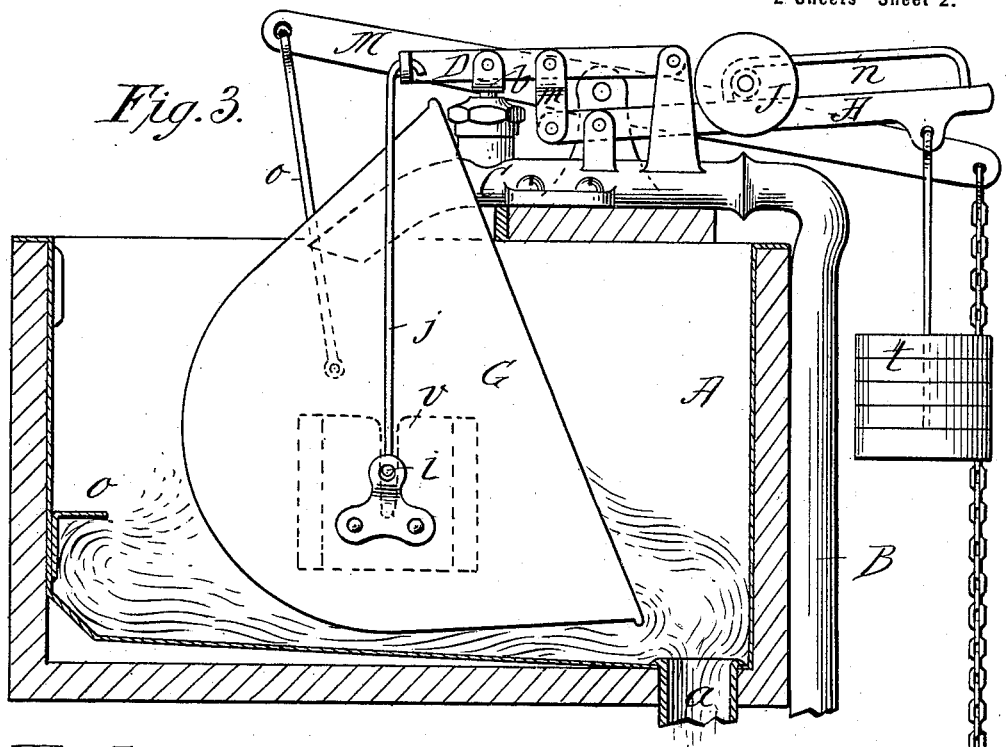
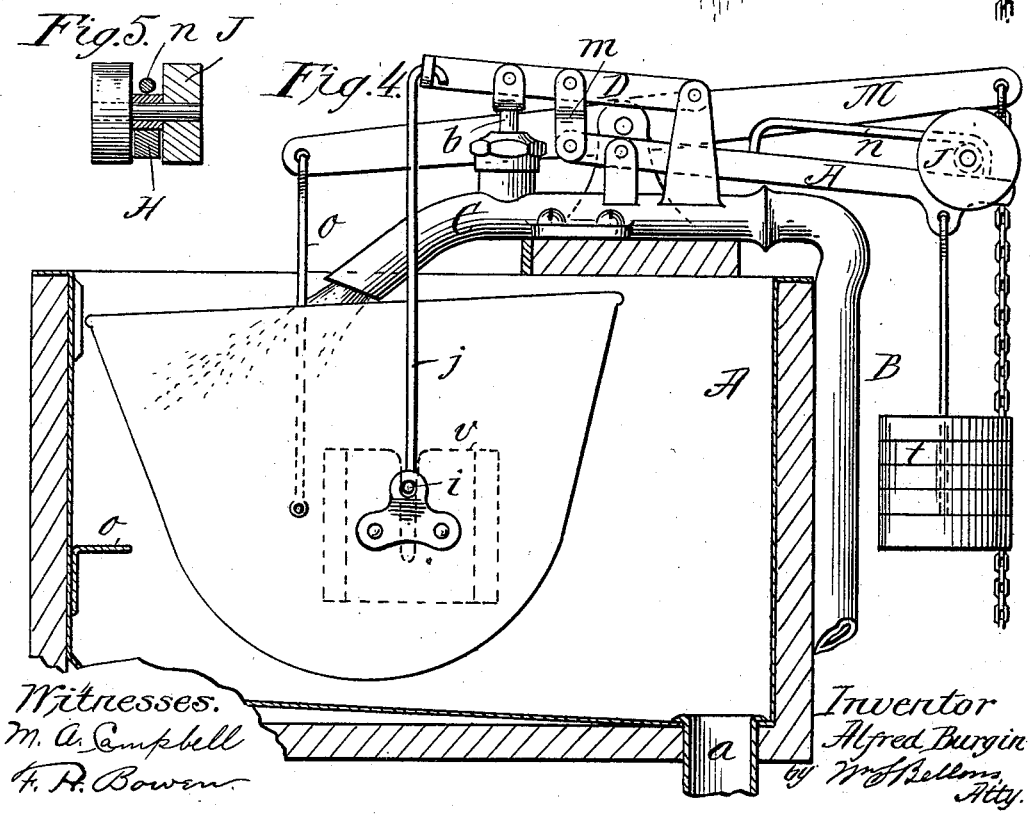
Witnesses.
M. A. Campbell
F. A. Bowen
Inventor
Alfred Burgin
by W. L. Bellons
Atty.

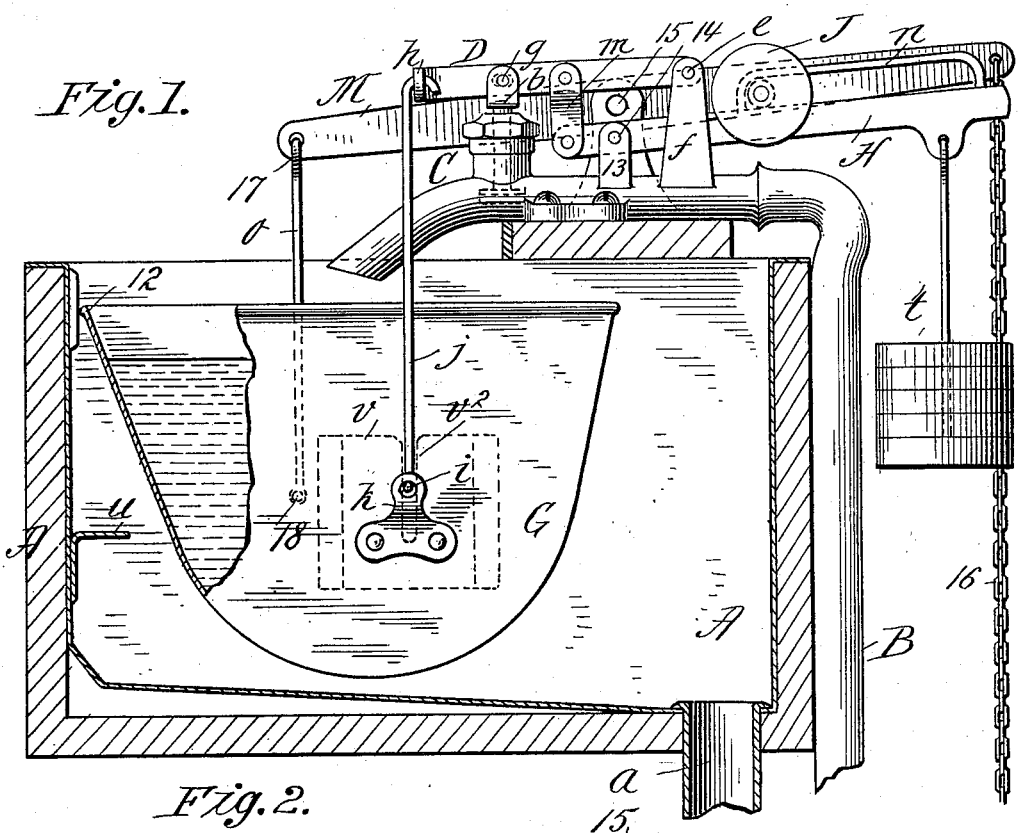

UNITED STATES PATENT OFFICE.

ALFRED BURGIN, OF SPRINGFIELD, MASSACHUSETTS.

WATER SUPPLYING AND CONTROLLING APPARATUS FOR WATER-CLOSET TANKS.

SPECIFICATION forming part of Letters Patent No. 607,652, dated July 19, 1898.

Application filed January 28, 1898. Serial No. 668,247. (No model.)

*To all whom it may concern:*

Be it known that I, ALFRED BURGIN, a citizen of the United States, and a resident of Springfield, in the county of Hampden and State of Massachusetts, have invented certain new and useful Improvements in Water Supplying and Controlling Apparatus for Water-Closet Tanks, of which the following is a specification.

This invention relates to the water supplying and controlling apparatus for water-closets, the object of the invention being to provide in a simple and practical way means for giving the water flush to the bowl as occasion may require, the supply of water being held in a tank or receptacle advantageously located within the usual tank, which is adapted to be delivered of its contents at pleasure, and when delivered to automatically receive a new water-supply therein, and when so received to automatically shut off the flow of water from the supply-pipe thereto, advantages derived by the present improvements being that the ordinary ball-cock is dispensed with, and because no water stands in the ordinary tank there is no liability of leakage therein, a more effective and ample water flush in the bowl may be given than ordinary as heretofore, and, furthermore, no tank-valve is required.

The invention comprises a water-closet tank of ordinary construction understood as having pipe connection with the water-closet bowl, a dumping-receptacle for water located within the tank and supported by suspension, the valve or cock connected with the usual water-supply pipe adapted when open to deliver the water into the said receptacle, and valve-operating means so constructed and arranged and combined with the said suspended dumping-receptacle that when the latter is empty or less full than to a given predetermined extent the valve will be open for water-delivery, the same automatically being closed immediately the quantity of water delivered into the said receptacle has reached the given predetermined amount.

The invention, furthermore, consists in certain peculiar constructions and arrangements of parts, all substantially as will hereinafter fully appear and be set forth in the claims.

Reference is to be had to the accompanying drawings, in which the present improvements are illustrated, and in which—

Figure 1 is a sectional view vertically through the ordinary water-closet tank and showing in side elevation the water supplying and controlling mechanism. Fig. 2 is a plan view of the same. Figs. 3 and 4 are sectional elevations similar to Fig. 1, but showing changed relations of the parts as incidental to the different conditions and operations, as will hereinafter be rendered manifest; and Fig. 5 is a view of the part in detail to be referred to.

Similar characters of reference indicate corresponding parts in all of the views.

In the drawings, A represents the water-closet tank, which may be of wood, zinc-lined, having the pipe connection $a$, whereby the water delivered thereinto on occasion as required may pass to the bowl in the usual way.

B represents the usual water-supply pipe, the same having connected thereto the valve or cock C, $b$ representing the valve-stem thereof, the same understood as lifting vertically to open, and closing the valve as it descends.

D represents a lever having a fulcrum-support at its one end at $e$ on the suitably provided ear-pieces $f$, which may be advantageously integrally cast as a part of the body or casing of the valve C, said lever having between its fulcrumed end and its other end an engagement, as indicated at $g$, with the bifurcated upper end portion of the valve-stem $b$. The said lever D is provided by having formed thereon as a part thereof or attached thereto the oppositely-extending members $h$, with extremities of which the hook-formed or eye-formed upper ends of the supporting-rod $j$ are engaged, said rods at their lower extremities having engagements with the opposite side wall of the water-receiving receptacle G, which is located within the main tank A.

In substance the valve-operating lever D is, as seen, of T form, and its transversely-extended members, through the rods $j$, support the dumping-tank G in the manner of the bail of a pail. Said tank G is formed with vertical parallel opposite sides and approximately semicircular bottom, continued in the upwardly-flaring end walls. The point of connection *i* of the suspension-rods *j* with the side ears *k*, riveted or soldered on the side walls of the metallic dumping-tank, it will be perceived, is somewhat to one side of the center of the tank G, and the tank G is so located that when it is in its upright position its upper edge 12 is in limiting abutment against the front end wall of the main tank A. A second set of ear-pieces 13 are provided upstanding above the body of the valve C, pivoted within which at 14 is the lever H, the point 14 of pivotal connection being near the forward end of said lever, the forward extremity of this lever being by the link *m* united to the valve-operating lever D at a point to the rear of the valve-stem engagement of said lever D. The said lever H constitutes a trackway or runner for the rolling weight J, said weight consisting of the opposite circular or cylindrical end sections and the uniting-axle, as seen in Fig. 5, and the lever H is provided with the wire retainer or guard *n*, having the greater portion of its length standing above and parallel with the upper edge of the said lever H, said rod having its end portions bent down and united to the lever, and constitutes in substance a slotway in which the axle of the roller-weight runs, and also means for limiting the running movement of the roller either forwardly or in the reverse direction.

The lever H has its rear extremity weighted, the extent of weighting being intended to be variable and more or less to accord with the size of the dumping-tank G and with the quantity of water desired to be delivered automatically thereinto before the delivery flow shall be stopped.

M represents a lever intermediately pivotally mounted at 15 on a suitable bracket or fixture at one side of the tank, the same having an operating-chain 16, and to the forward end of this lever is connected the eye 17 of the dependent rod *o*, which has a pivotal connection at 18 with the side of the tank at a point forward of its pivotal support on the suspension yoke, stirrup, or bail D *j*.

To the lever M a chain or cord 16 is connected to form a means easily accessible for overturning the receptacle G into the position substantially as shown in Fig. 3.

Fig. 1 represents what may be most properly regarded as the normal position of the parts of the apparatus, it being seen that the dumping-receptacle has been filled, and by reason of the sufficient weight constituted by the receptacle plus the water therein the valve-operating lever D is swung into the forwardly and downwardly inclined position, bearing down the valve-stem to close the valve, and corresponding to these positions the link-connected lever H also occupies a forwardly downwardly inclined position, whereby the roller-weight has run to its limit nearer the valve-stem.

Fig. 3 represents the lever M as having its chain end drawn down, its opposite end through the connecting-rod *o* serving to overturn the receptacle G, whereby the contents thereof shall be in whole or in greater part discharged into the main tank A to immediately pass therefrom into the water-closet bowl.

It is understood that immediately the overturning and discharge of the liquid takes place, the lightened dumping-tank G, not being of sufficient weight of itself to counterbalance the weighted lever H, the lever exerts, by being permitted to swing into the position indicated in Fig. 4, a reversing position of the valve-operating lever D, lifting the valve-stem and permitting the delivery flow of water into the receptacle G.

It is understood that by reason of the point of pivotal support *i* being to the rear of the center of the receptacle the latter will immediately after discharging its contents and so soon as the chain 16 is released automatically resume its upright position, and immediately the overturning is performed and the levers reversed, as hereinabove explained, the roller-weight J will run down the inclined top of the lever to the position indicated in Fig. 4 for the purpose of more positively assuring that the valve will remain open until a sufficient and preponderating quantity of water has been delivered into receptacle G, whereupon the latter will settle again to the position shown in Fig. 1, closing the valve, the roller-weight concurrently therewith rolling down to the rear end portion of the now reversed lever H.

By adjusting the applied weight *t* on the end of the lever H the quantity of water which may be delivered at each operation of the apparatus before the automatic stoppage thereof ensues may be variable to suit different purposes or requirements.

It will be perceived on reference to the elevation view that the main tank A is represented as provided with a lining of thin metal, as sheet zinc or copper, and that there is provided a horizontal inwardly-extended sheet-metal guard or lip *u* at the front inner wall of the main tank for the purpose of preventing the forwardly-rebounding water delivered into tank from splashing over the top of the tank.

In order to prevent displacement of the invertible receptacle G and yet to permit it to have both its comparatively slight rising-and-falling movement and also a tilting movement, opposing vertical guideways *v* are provided within the opposite sides of the tank A, the same being shown in full lines in Fig. 2 and in dotted lines in Fig. 1. This may advantageously be made of thin sheet metal having its marginal portions angularly bent, as indicated, whereby to form confinement portions to be soldered to the sides of the lined tank and having the vertical central upwardly-opening aperture $b^2$, substantially as shown. This provision insures in a simple yet effective way against undue swinging movements being allowed to the suspended receptacle. It of course will be apparent that the weight here shown as constituted by the separable suspended scale-weight sections for the lever H may be otherwise applied—as, for instance, by forming by casting a sufficient preponderating rear end protuberance on the lever H as an integral part thereof. It is preferred, however, to provide the weight in removably-engaged parts or sections for the purposes of regulation, as hereinbefore alluded to.

Having thus described my invention, what I claim, and desire to secure by Letters Patent, is—

1. The combination with the water-supply pipe having a valve and a lever for operating said valve, normally and automatically applied and operative to open the valve, of a receptacle suspended from said lever and adapted, on receiving a sufficient overbalancing quantity of water thereinto, to swing the lever and close the valve, and means for overturning said receptacle for discharging the contained water therefrom, substantially as described.

2. The combination with a valved water-supply pipe, of a lever device operatively connected with the valve, of a receptacle suspended on the lever device, means for discharging the receptacle of its contained liquid, and a roller-weight adapted to run back and forth on the lever device, substantially as and for the purposes set forth.

3. The combination with the water-supply pipe having a valve with a stem, of the lever D engaged with said stem, a receptacle with which the valve delivers, a second lever hooked to the lever D, a roller-weight thereon, and means for discharging said receptacle of its contained liquid, substantially as described.

4. The combination with the water-supply pipe having a valve with a stem, and of the lever D engaged with said stem, a receptacle suspended from said lever D, a second lever hooked to said lever D, and constructed with the slot, a roller-weight adapted to run by its axle back and forth in the slot-provided lever, and means for overturning the said receptacle, substantially as described.

5. The combination with the water-supply pipe having the valve with a stem, the valve-body being provided with the upstanding ear-lug $f$ and 13, of the T-shaped lever D pivoted in lug $f$ and engaging the valve, the lever H pivoted in lug 13, the link connecting it with lever D, the rods $j$ depending from the transverse members of said T-lever, the open-top receptacle G having pivotal support on said rods $j$ at points at one side of its middle, the lever M and connecting-rod $o$ engaged with the receptacle at its side opposite its pivotal support, substantially as and for the purposes set forth.

6. The combination with the main tank A having outlet-passage $a$, and guard $u$, of the water-supply pipe having valve C with stem $b$, lever D engaging said stem and supporting pivotally in suspension, the tilting receptacle G, the lever H linked to lever D and provided with the roller-weight J, the lever M having operating connection 16, and the rod $o$ connecting said lever with a portion of the receptacle forward of its pivotal support, substantially as and for the purposes set forth.

7. The combination with the water-supply pipe having a valve, with a stem, and the main tank A provided at opposite sides with the vertical guides $v$, of a lever device operatively connected with the valve, a receptacle suspended from and pivotally suspended below the lever and valve and having its pivot members located in said guides, and means for overturning said suspended receptacle, substantially as and for the purposes set forth.

Signed by me, at Springfield, Massachusetts, this 26th day of January, 1898.

ALFRED BURGIN.

Witnesses:
 WM. S. BELLOWS,
 M. A. CAMPBELL.